Jan. 9, 1968 C. E. BECKER 3,362,062
METHOD OF FORMING A PERMEABLE STRUCTURE
FOR AERATING BULK MATERIALS
Filed March 7, 1966 2 Sheets-Sheet 1

INVENTOR.
CARL E. BECKER
BY Eugene N. Riddle
ATTORNEY

Jan. 9, 1968   C. E. BECKER   3,362,062
METHOD OF FORMING A PERMEABLE STRUCTURE
FOR AERATING BULK MATERIALS
Filed March 7, 1966

INVENTOR.
CARL E. BECKER
BY
ATTORNEY

United States Patent Office 3,362,062
Patented Jan. 9, 1968

3,362,062
METHOD OF FORMING A PERMEABLE STRUCTURE FOR AERATING BULK MATERIALS
Carl E. Becker, St. Louis County, Mo., assignor to ACF Industries, Incorporated, New York, N.Y., a corporation of New Jersey
Filed Mar. 7, 1966, Ser. No. 532,448
1 Claim. (Cl. 29—455)

ABSTRACT OF THE DISCLOSURE

A method of forming a load bearing fluid permeable structure for aerating or fluidizing finely-divided bulk materials, such as granular or pulverulent material, including forming a plurality of dimples in a yieldable fluid permeable sheet, placing the fluid permeable sheet on a rigid plate in parallel relation thereto with the dimples and a spacer separating the sheet and plate, and securing the sheet to the plate at the dimples and spacer. A plenum chamber is formed between the plate and permeable sheet.

*Background and description of the invention*

Especially in railway covered hopper cars, aeration pads are normally positioned in a bottom outlet structure and support the superjacent lading thereon. Aeration or fluidizing pads and panels employed as a wall for a plenum chamber and supporting a load thereon require a certain rigidity and strength to support the load, especially if the width of the plenum chamber is relatively large. In some instances, generally rigid backing plates or reinforcing ribs have been provided to strengthen the materials employed heretofore, such as canvas, heavy cloth, felted material. In other instances, intermediate supports have been provided between the permeable wall and the opposite wall of the plenum chamber to shorten the span. When felted unspun fibers of wood, glass, mineral wool or asbestos have been employed, it has been found difficult to obtain a uniform permeability in addition to the problem of having to reinforce the material to increase its rigidness.

It is an object of the present invention to provide a novel permeable structure forming a load bearing or load carrying structure which may be of any desired width or length thereby not being limited in dimensions.

An additional object of the present invention is to provide such a permeable structure employing a load carrying permeable sheet which is not reinforced to increase the rigidity or strength of the permeable sheet.

Another object of this invention is the provision of a load bearing, relatively thin permeable panel having a plenum chamber therein thereby to permit its use in a minimum of space.

Briefly described, the present invention comprises a fluid permeable sheet and a generally rigid plate spaced from each other in a generally parallel relation to form a plenum chamber therebetween, said fluid permeable sheet having a plurality of dimples therein protruding from the face thereof adjacent said plate and in contact with the adjacent face of the plate to form a plurality of intermediate supports between the permeable sheet and plate extending the depth of the plenum chamber, and means at said dimples attaching the sheet to said plate. The sheet and closely spaced plate form a relatively thin permeable panel which may be employed in a minimum of space. The dimples act as load transfer supports in transferring loads from the permable sheet to the plate.

The invention accordingly comprises the constructions hereinafter described, the scope of the invention being indicated in the following claims.

Figure 1:
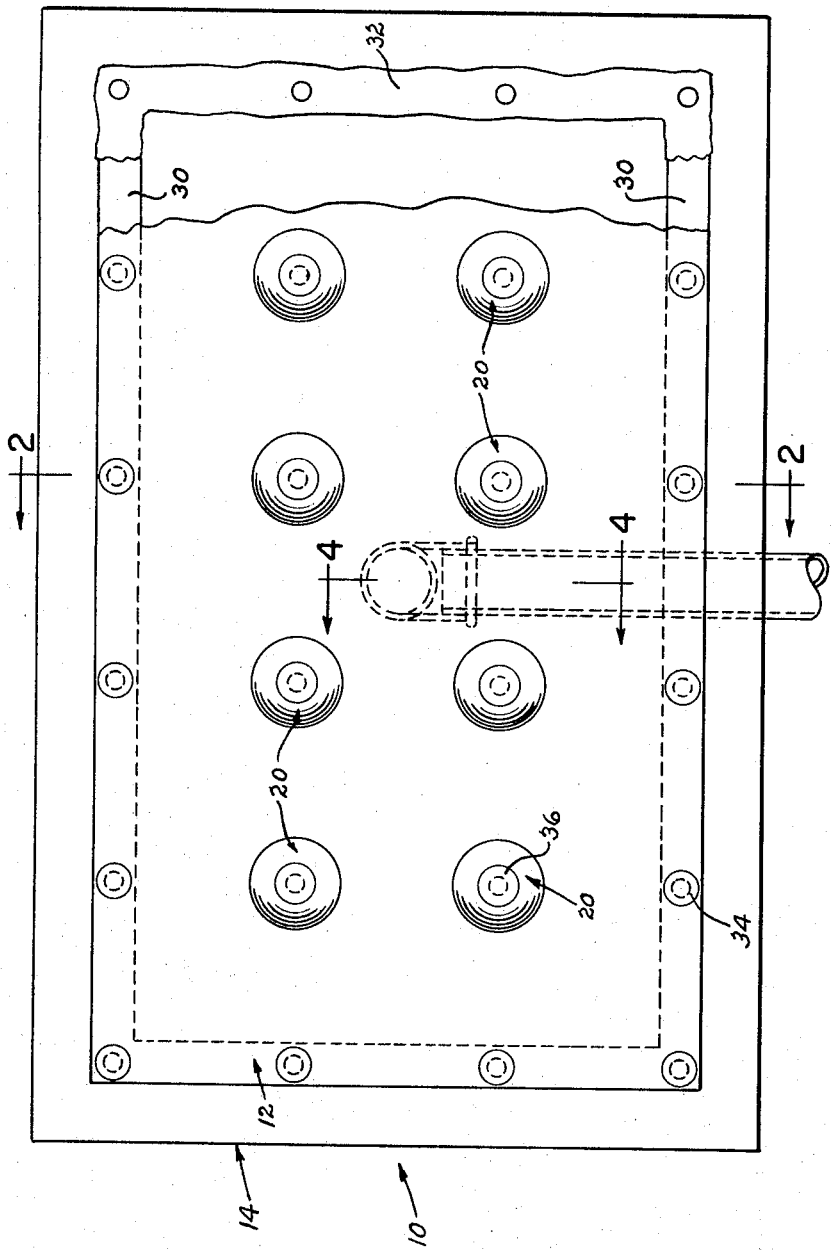
Figure 2:
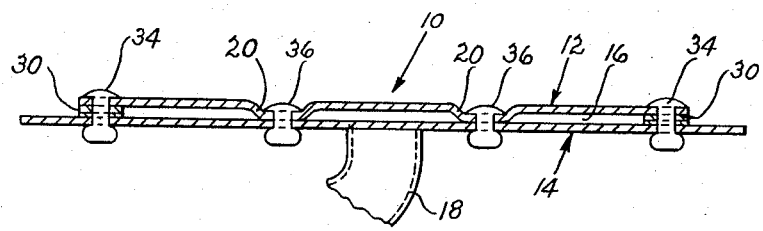
Figure 3:
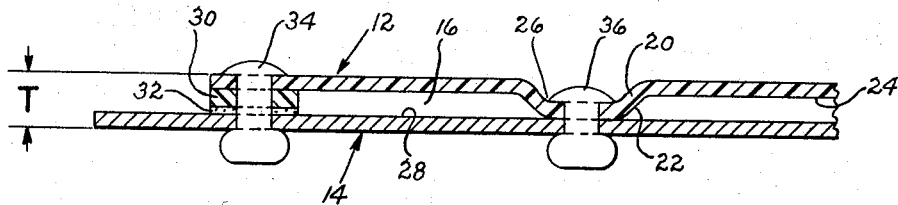
Figure 4:
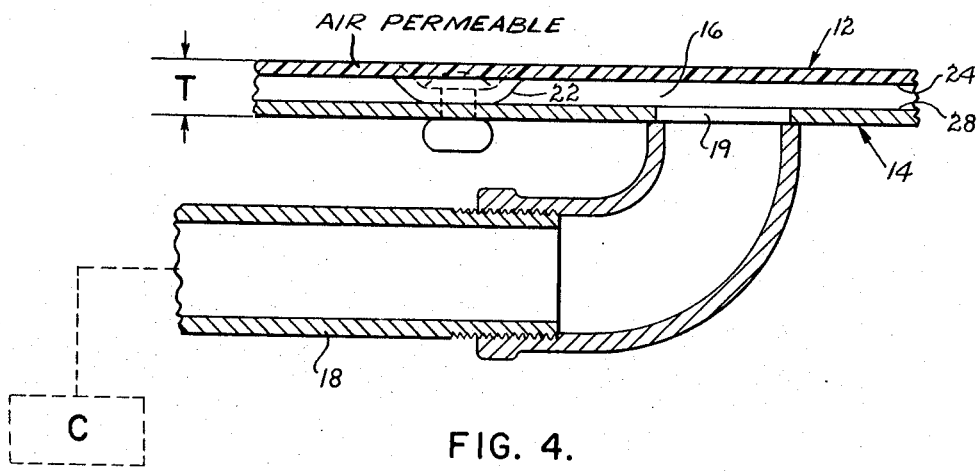

In the accompanying drawings in which one of various possible embodiments of the invention is illustrated;
FIGURE 1 is a top plan of the fluid permeable, load carrying structure forming the present invention;
FIGURE 2 is a section taken generally along line 2—2 of FIGURE 1 and illustrating the relatively thin panel forming the load carrying structure;
FIGURE 3 is an enlarged fragment of FIGURE 2; and
FIGURE 4 is a section taken generally along line 4—4 of FIGURE 1 and showing means to supply air to the plenum chamber of the load carrying structure.

Corresponding reference characters indicate corresponding parts throughout the several views of the drawings.

Referring to the drawings for a better understanding of this invention, the load carrying structure is indicated generally 10 and is adapted to be employed in an outlet structure in which it is desired to fluidize or aerate the material being unloaded, such as a hopper or the like, in which granular and pulverulent materials are disposed in contact with, and at least partially supported on load carrying structure 10.

Load carrying structure 10 comprises a permeable sheet generally indicated 12 and a plate generally indicated 14 spaced in a generally parallel relation from sheet 12 to form a plenum chamber 16 therebetween. A source of air, such as an air compressor C, supplies air to plenum chamber 16 from pipe 18 connected to plate 14 at opening 19.

Sheet 12 is fluid permeable and may be formed of any suitable yieldable material, such as, for example, a porous plastic material such as porous polyethylene. One material which has been found to be satisfactory is a porous polyethylene material distributed under the name "Vyon" by Atlas Mineral Products Company, Mertztown, Pennsylvania. Porous polyethylene is formed from polyethylene fibers bonded to each other by a suitable thermosetting resin. Vyon polyethylene has a generally uniform pore size, a relatively smooth surface, and is relatively light and flexible.

The permeability of a porous medium is a measure of the ease with which a fluid will pass through the medium; the higher the permeability, the higher the flow rate for a given pressure gradient. The flow rate is dependent on the fluid conductivities of all the flow channels in the medium and is effected by the variations and size, shape, direction, and interconnections of all the flow channels. The resistance to the passage of gas through the porous medium may conveniently be expressed in terms of gas volume passing at a specified pressure drop across the medium. As employed herein, the term "permeability" is defined as "the amount of air measured in cubic feet and at 70° F. and 25% relative humidity which will pass through the area of one square foot of permeable member 12 in one minute when tested under an equivalent pressure differential of 2 inches of water." A permeability of around thirteen for sheet 12 has been found to be satisfactory for handling finely-divided particles ranging in size between about ten (10) and one hundred (100) microns. This rating may be obtained by employing a sheet 12 made of the material sold under the name "Vyon" and having a thickness around three sixteenths (3/16) inch. Air under pressure from compressor C to plenum chamber 16 through pipe 18 provides an air flow into a compacted mass of material over permeable sheet 12.

Sheet 12 has a limited degree of flexibility and it is desirable to have a plurality of intermediate supports between sheet 12 and plate 14 to transfer loads from sheet 12 to plate 14, particularly if the width of plenum chamber 16 is relatively large. Sheet 12 is formed with a plurality of dimples indicated generally at 20. Dimples 20 provide protuberances or extensions 22 extending from face 24 of sheet 12 and corresponding depressions 26 on face 28 of sheet 12.

To form dimples 20, sheet 12 is heated to around 300° F. in an oven and is then placed between a pair of dies which press dimples 20 in the sheet. A spacer strip 30 is secured along the marginal portion of sheet 12 about its entire periphery. Strip 30 may be formed of polyethylene and heat fused to face 24 of sheet 12. Then, strip 30 and sheet 12 may be placed on plate 14. The marginal portion of plate 14 in contact with strip 30 first has a suitable adhesive 32 disposed thereon to form a substantially air-tight connection between sheet 12 and plate 14. An adhesive which has been found to be satisfactory for bonding strip 30 to plate 14 is adhesive EC-2216 produced by Minnesota Mining and Manufacturing Company, Adhesives, Coatings and Sealers Division, 900 Bush Avenue, St. Paul 6, Minnesota. Adhesive EC-2216 is a one hundred percent solids, thermosetting liquid adhesive having high strength properties at service temperatures from −70° F. to 200° F. The adhesive has an epoxy resin base and may be applied by a knife coating, spatula, or trowel.

Outer rivets 34 are then secured about the periphery of sheet 12 and plate 14. Inner rivets 36 are placed within depressions 26 and extend through protuberances 22 for securing sheet 12 to plate 14 within the confines of spacer 30. Rivets 34 and 36 are pop rivets which may be inserted from the upper side of sheet 12 and then expanded. Adhesive 32 may be cured in place as rivets 34 will hold spacer 30 tightly against adhesive 32. A relatively thin panel is formed by the load carrying structure 10 and it may be employed in a minimum of space. A total panel thickness T of nine sixteenths (9/16) inch has been found to be satisfactory with sheet 12 having a thickness of three sixteenths (3/16) inch, spacer 30 and adhesive 32 of a combined thickness of three sixteenths (3/16) inch, and metal plate 14 of a thickness of three sixteenths (3/16) inch. Dimples 20 may be positioned around four (4) inches from each other and provide adequate support for lading and the like resting on face 28 of sheet 12.

From the foregoing, it will be understood that a relatively thin permeable structure has been provided in which a permeable sheet has been employed having dimples which provide intermediate supports for transferring loads from the sheet to a metal plate adjacent the sheet. The method of forming the dimples in sheet 12 and then securing the sheet to the metal plate to form a plenum chamber therebetween may be performed in a minimum of time.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A method of forming a load bearing structure for aerating finely-divided particles comprising the steps of forming a plurality of dimples in a yieldable fluid permeable sheet to provide depressions on one face of the sheet and corresponding protuberances on the other face of the sheet, placing the fluid permeable sheet on a generally rigid plate with a spacer between the marginal portion of the sheet and the plate about the entire periphery of the sheet, the dimples being in contact with the plate and forming intermediate supports to transfer loads from the sheet to the plate, and attaching the sheet to the plate at both the dimples and the spacer.

References Cited

UNITED STATES PATENTS

| | | | |
|---|---|---|---|
| 1,782,234 | 11/1930 | Hofmann | 25—455 |
| 2,304,718 | 12/1942 | Swart | 52—621 X |
| 2,391,997 | 1/1946 | Noble | 29—455 |
| 2,393,697 | 1/1946 | Lornitzo | 29—455 X |
| 3,020,986 | 2/1962 | Kirk et al. | 52—621 |
| 3,118,010 | 1/1964 | Harrington | 264—314 |
| 3,231,454 | 1/1966 | Williams | 161—130 X |

FREDERICK L. MATTESON, JR, *Primary Examiner.*

JOHN J. CAMBY, *Examiner.*